(12) United States Patent
Tahir et al.

(10) Patent No.: US 11,453,441 B2
(45) Date of Patent: Sep. 27, 2022

(54) SUBFRAME FOR A MOTOR VEHICLE

(71) Applicant: Autotech Engineering Deutschland GmbH, Bielefeld (DE)

(72) Inventors: Zidane Tahir, Durham (GB); Raymond Aso, Bowburn (GB); Tom Richford, Richmond (GB)

(73) Assignee: Autotech Engineering Deutschland GmbH, Bielefeld (DE)

( * ) Notice: Subject to any disclaimer, the term of this patent is extended or adjusted under 35 U.S.C. 154(b) by 118 days.

(21) Appl. No.: 17/123,324

(22) Filed: Dec. 16, 2020

(65) Prior Publication Data
US 2021/0188357 A1 Jun. 24, 2021

(30) Foreign Application Priority Data

Dec. 20, 2019 (EP) ..................... 19218436

(51) Int. Cl.
*B60J 7/00* (2006.01)
*B62D 21/03* (2006.01)
(Continued)

(52) U.S. Cl.
CPC ........... *B62D 21/03* (2013.01); *B62D 29/008* (2013.01); *B62D 21/155* (2013.01)

(58) Field of Classification Search
CPC .. B62D 29/008; B62D 21/11; B62D 25/2054; B60R 19/18; B60R 2019/182; B29C 48/08; A61P 43/00; Y02P 70/50
See application file for complete search history.

(56) References Cited

U.S. PATENT DOCUMENTS 6,470,990 B1* 10/2002 Panoz ................. B62D 29/008
180/311
2007/0169982 A1* 7/2007 Ogawa ..................... B60G 3/20
180/311
(Continued)

FOREIGN PATENT DOCUMENTS

DE 102016201815 A1 6/2017

*Primary Examiner* — Kiran B Patel
(74) *Attorney, Agent, or Firm* — The Webb Law Firm

(57) ABSTRACT

The invention relates to a subframe (1) for a motor vehicle, comprising at least three beams, of which, in the assembled state of the subframe, at least two beams (3, 4) extend at a distance from one another, substantially along the longitudinal axis of the motor vehicle and at least one beam (6, 7) extends transversely to the longitudinal axis of the motor vehicle, at least one of the beams being an extruded beam (3, 4), and at least one cast node (11) of aluminium, magnesium or an alloy based on aluminium and/or magnesium, the cast node (11) connecting the extruded beam (4) and at least one of the other beams (6) to another, wherein the cast node (11) has an arm-shaped beam connecting element (11.4), wherein the extruded beam (4) overlaps the beam connecting element (11.4), and wherein the extruded beam (4) is connected to the beam connecting element (11.4) by a weld seam (14). In order to improve such a subframe with regard to high strength and durability and low weight of the subframe, the invention provides that the cast node (11) has on the beam connecting element (11.4) a shoulder which defines a shoulder end face (16), wherein the shoulder end face (16) on the one hand and the extruded support (4) and/or the weld seam (14) on the extruded beam (4) on the other hand define a groove-shaped or trench-shaped recess (17), whose width or average width (W) is at least 2.5 times, preferably at least 3.5 times, particularly preferably at least 4 times, the wall thickness (te) of the extruded beam (4), and wherein the weld seam (14) is designed as a lap seam.

13 Claims, 4 Drawing Sheets

(51) Int. Cl.
  *B62D 29/00* (2006.01)
  *B62D 21/15* (2006.01)

(56) References Cited

U.S. PATENT DOCUMENTS

| | | | | |
|---|---|---|---|---|
| 2008/0265626 A1* | 10/2008 | Dorr | ............... | B62D 21/11 |
| | | | | 164/138 |
| 2014/0145423 A1* | 5/2014 | Isakiewitsch | .......... | B62D 21/11 |
| | | | | 280/781 |
| 2014/0217782 A1* | 8/2014 | Mohrlock | .............. | B62D 21/16 |
| | | | | 296/204 |
| 2015/0298741 A1* | 10/2015 | Winberg | .............. | B62D 21/155 |
| | | | | 296/187.09 |
| 2016/0039464 A1* | 2/2016 | Hirano | ................. | B60K 5/1208 |
| | | | | 180/312 |
| 2021/0188357 A1* | 6/2021 | Tahir | ................... | B62D 29/008 |

\* cited by examiner

SUBFRAME FOR A MOTOR VEHICLE

CROSS-REFERENCE TO RELATED APPLICATION

This application claims priority to European Patent Application No. 19218436.4 filed Dec. 20, 2019, the disclosure of which is hereby incorporated by reference in its entirety.

BACKGROUND OF THE INVENTION

Field of the Invention

The invention relates to a subframe for a motor vehicle, comprising at least three beams, of which, in the assembled state of the subframe, at least two beams extend at a distance from one another substantially along the longitudinal axis of the motor vehicle and at least one beam extends transversely to the longitudinal axis of the motor vehicle, at least one of the beams being an extruded beam, and at least one cast node of aluminium, magnesium or an alloy based on aluminium and/or magnesium, the cast node connecting the extruded beam and at least one of the other beams to another, wherein the cast node has an arm-shaped beam connecting element, wherein the extruded beam overlaps the beam connecting element, and wherein the extruded beam is connected to the beam connecting element by a weld seam.

Description of Related Art

Subframes for motor vehicles, also designated as axle carriers, are known in many different designs. They are designed to be as light as possible, with high strength and rigidity, and usually have link connections (bearing mounts) for wheel guide elements and other units, in order to enable, as a pre-assembly unit, the installation of complete front or rear axle modules with drive units. Traditionally, subframes are assembled from longitudinal members and cross members made of steel materials and welded together. Furthermore, subframes are also known whose longitudinal members and cross members are made of aluminium materials.

The term "longitudinal members" is used here to refer to supporting elements or sections of supporting elements of the subframe which, in the assembled state of the subframe, extend essentially along the longitudinal axis of the motor vehicle concerned and thus essentially in the direction of travel, while "cross members" refers to supporting elements or sections of supporting elements of the subframe which, in the assembled state of the subframe, extend transversely to the longitudinal axis of the motor vehicle and thus transversely to the direction of travel.

From DE 10 2016 201 815 A1 a subframe is known which has several cast nodes which connect a left or right longitudinal member and a cross member with each other. The cast nodes consist of cast aluminium, for example, and have a longitudinal member connecting point and a tubular cross member connecting point. The cross member is designed as an extruded profile or open profile. In the embodiments of the known subframe shown, the cross member is welded to the cross member connecting point in a lap joint by means of friction stir welding. The longitudinal member, on the other hand, is connected to the longitudinal member connecting point by means of screws or, alternatively, is also welded by friction stir welding. Furthermore, DE 10 2016 201 815 A1 states that it is also conceivable to connect the cross member and the cross member connecting point by means of inert gas welding, wherein fillet welds or hole welds would be suitable.

Starting therefrom, the invention is based on the object of further improving a subframe of the type mentioned above with regard to high strength and durability and low weight of the subframe.

SUMMARY OF THE INVENTION

This object is solved by a subframe according to the invention. Advantageous configurations of the subframe according to the invention are described below.

The subframe according to the invention is characterised in that the cast node has on the beam connecting element a shoulder which defines a shoulder end face, wherein the shoulder end face on the one hand and the extruded support and/or the weld seam on the extruded beam on the other hand define a groove-shaped or trench-shaped recess, whose width or average width is at least 2.5 times, preferably at least 3.5 times, particularly preferably at least 4 times, the wall thickness of the extruded beam, and wherein the weld seam is designed as a lap seam.

The invention is based on the idea of improving the fatigue strength and service life of the subframe and/or reducing the weight of the subframe by positioning and shaping the weld seam which connects the extruded cross member or longitudinal member to the casting node, provided that the subframe is well manufacturable. The inventors have recognised that this can be achieved by the above-mentioned characterising features of the subframe according to the invention. In particular, the inventors have recognised that during driving operation of a motor vehicle equipped with the subframe, stresses occurring in the area of the weld seam due to the groove-shaped or trench-shaped recess are relatively low with the specified minimum width, and that due to the stress-reduced position of the weld seam, the wall thickness of the extruded cross member or longitudinal member can be greatly reduced.

The upper limit of the (average) width of the groove or trench-shaped recess can, for example, be 20 times, preferably 15 times, in particular 10 times the wall thickness of the extruded beam.

The weld seam for the positive material connection of the extruded cross member or longitudinal member with the cast node of the subframe according to the invention can be carried out, for example, by gas-shielded welding, in particular as MIG welding or MAG welding, or also by other welding processes, such as laser welding, preferably with filler wire, or laser-arc hybrid welding.

The groove-shaped or trench-shaped recess with the minimum width specified above offers the particular the advantage that the joint (joint edge of the lap joint), where the welded joint of the extruded cross member or longitudinal member with the cast node is produced, is more easily accessible. Thus, a larger welding head, especially a welding head for laser-arc hybrid welding, which offers advantages with regard to the fatigue strength of the weld seam, can be moved easily along the joint.

Furthermore, the groove-shaped or trench-shaped recess with the minimum width specified above offers the advantage that the thickness of the weld seam can be increased in the form of a lap seam without causing welding defects (e.g. burn-through or excessive weld penetration at the weld seam, or a weld seam offset).

An advantageous embodiment of the subframe according to the invention provides that it comprises at least four beams, of which at least two beams extend at a distance from one another, substantially along the longitudinal axis of the motor vehicle and at least two beams extend at a distance from one another, transversely to the longitudinal axis of the motor vehicle, the two beams extending substantially along the longitudinal axis of the motor vehicle and/or the two beams extending transversely to the longitudinal axis of the motor vehicle are designed in accordance with the extruded beam, wherein at least four cast nodes corresponding to said cast node are present which, together with the beams, define a closed frame structure, and wherein the extruded beams are connected to the cast nodes in such a way that at least one recess corresponding to said groove-shaped or trench-shaped recess is formed at each of the at least four cast nodes. This embodiment offers the advantage that the subframe can absorb high dynamic forces, and this at a significantly reduced weight compared to conventional subframes with a closed frame structure.

Another advantageous embodiment of the subframe is that the respective extruded beam is designed as a closed hollow profile. This embodiment allows a very large reduction in the weight of the subframe while maintaining a high degree of rigidity.

In order to achieve a particularly stable connection of the cast node and the extruded beam, a further advantageous embodiment of the invention provides for the weld seam to be designed as a circumferential lap seam.

A further advantageous embodiment of the subframe provides that the respective extruded beam is made of aluminium, magnesium or an alloy based on aluminium and/or magnesium. This embodiment also contributes to reduce the weight of the subframe.

In order to reduce the weight and ensure good manufacturability of the subframe, it is particularly advantageous if, after a further embodiment of the invention, the respective beam connecting element is designed in the form of a pipe socket. The pipe socket-shaped beam connecting element preferably has a cylindrical plug-in section which engages in the extruded beam with an exact fit. This plug connection is preferably designed in such a way that an axial section of the extruded beam is at first axially displaceable relative to the plug section of the beam connecting element and, if necessary, can be adjusted to compensate for manufacturing tolerances, until the positive material connection is then made by producing the weld seam (lap seam). The cylindrical plug-in section can, for example, have an oval, elliptical, circular or ring-shaped hollow section profile or a hollow section profile comprising several curved sections, whereby the extruded beam has a matching hollow section profile.

According to a further advantageous embodiment of the invention, the beam connecting element of the cast node has a wall thickness in the region of the groove-shaped or trench-shaped recess which is equal to or greater than the wall thickness of the extruded beam, e.g. longitudinal member. This embodiment has a very positive effect on the quality of the weld seam. This is because the relatively large wall thickness of the beam connecting element in the area of the groove-shaped or trench-shaped recess offers the advantage that the thickness or cross-sectional area of the lap joint can be increased without welding defects of the type mentioned above.

The cast node is produced, for example, in a low-pressure casting process, after which a surface treatment, e.g. a chip removing process or machine processing, is carried out at least in the area of the beam connecting element. The minimum wall thickness of the cast node in the area of the beam connecting element is, for example, approx. 4.5 mm after surface treatment.

The wall thickness of the beam connecting element in the region of the groove-shaped or trench-shaped recess is preferably between 1.2 and 3 times, preferably between 1.5 and 2.5 times the wall thickness of the extruded beam. This embodiment has a particularly positive effect on the quality of the weld seam.

A further advantageous embodiment of the subframe according to the invention provides that the respective beam connecting element comprises a first substantially axial cast node portion and a second substantially axial cast node portion, said second axial cast node portion is welded to the extruded beam and has a smaller outer dimension, preferably a smaller outer diameter than the first axial cast node portion, and wherein the outer dimension or outer diameter of the first axial cast node portion is greater than or equal to the product of the outer dimension or outer diameter of the second axial cast node portion and 1.3 times the wall thickness of the extruded beam. Tests carried out by the inventors have shown that with this embodiment of the invention both a particularly high weight reduction and a particularly long service life of the subframe can be achieved. Particularly advantageous in this case is an embodiment in which the outer dimension or outer diameter of the first axial cast node section is greater than or equal to the outer dimension or outer diameter of the extruded beam.

A further advantageous embodiment of the subframe provides that the respective beam connecting element has a constriction, preferably a circumferential constriction, on the inside at the end of the first axial cast node section facing away from the extruded beam. This improves the stability, in particular the bending strength, of the cast node at a comparatively low total weight.

After a further advantageous embodiment of the subframe according to the invention, the extruded beam overlaps the beam connecting element with an axial dimension which is less than or equal to the width or average width of the groove-shaped or trench-shaped recess. This embodiment allows compensation of axial length tolerances of the cast node, in particular of the beam connecting element, and of the extruded beam and is also advantageous with regard to the weight reduction of the subframe.

Another advantageous embodiment of the subframe is that the respective extruded beam has one or more openings in its profile wall, which are arranged at a distance from the beam connection element and open downwards in the intended installation position of the subframe. The through-holes allow liquid that has penetrated into the extruded beam to drain off. The openings also reduce the weight of the extruded beam and thus of the subframe.

BRIEF DESCRIPTION OF THE DRAWINGS

In the following, the invention is explained in more detail on the basis of a drawing showing an embodiment.

DESCRIPTION OF THE PREFERRED EMBODIMENTS

Figure 1:
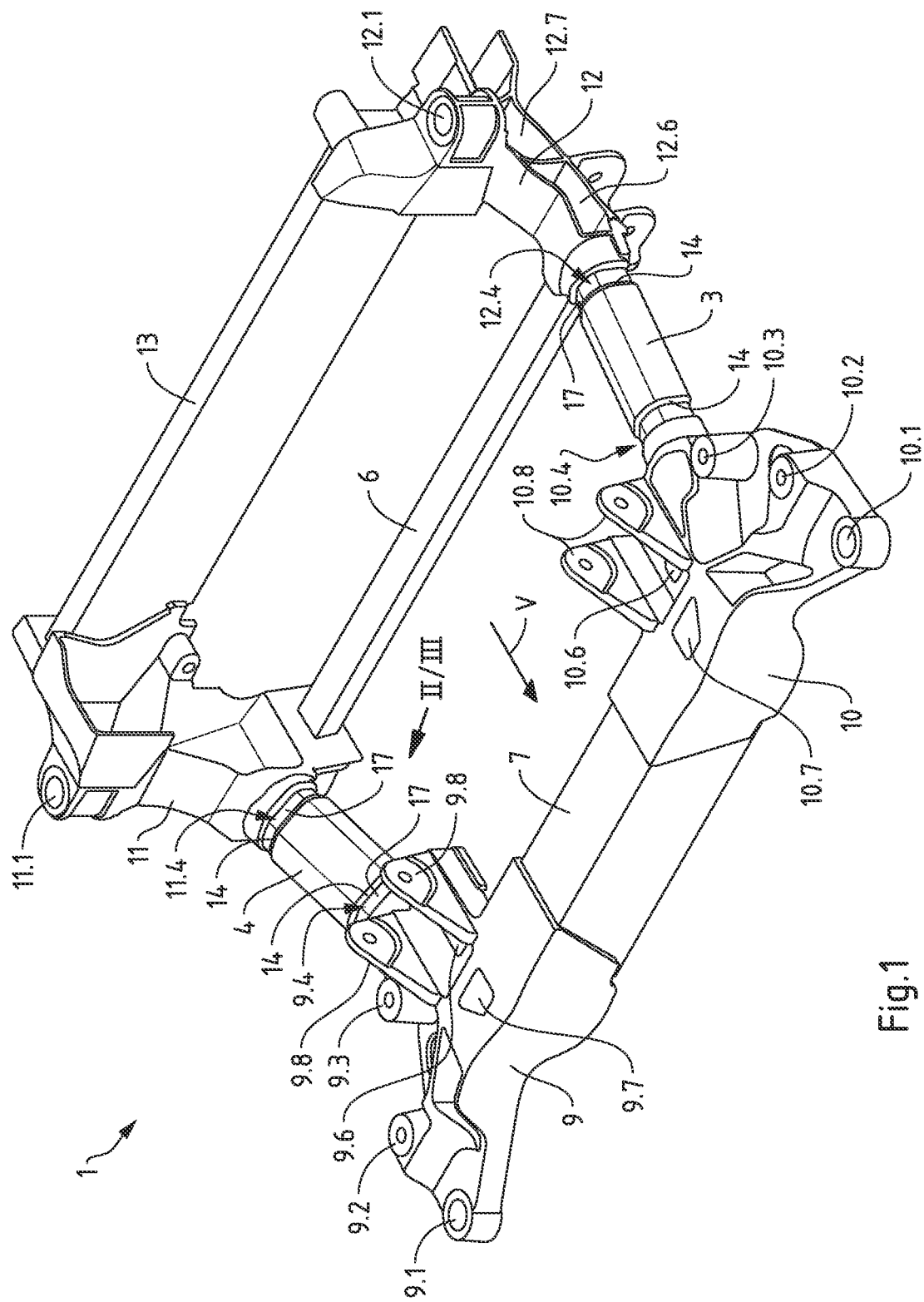
FIG. 1 shows a subframe according to the invention for a motor vehicle, in a perspective view.

FIG. 1 shows an exemplary embodiment of the subframe 1 according to the invention, which has two opposing beams 3, 4, also called longitudinal members, extending essentially along the longitudinal axis of a motor vehicle and thus in the direction of travel V, and two opposing beams 6, 7, also called cross members, extending transversely to the longitudinal axis of the motor vehicle. The beams 3, 4, 6, 7 are connected to each other by means of cast nodes 9, 10, 11, 12, whereby the cast nodes 9, 10, 11, 12 together with the beams 3, 4, 6, 7 define a closed frame structure. The reference numeral 13 designates a further optional cross member which is connected to the cast nodes 11, 12 at the rear in the direction of travel V.

The cast nodes 9, 10, 11, 12 are provided with bush-like connecting elements 9.1, 10.1, 11.1, 12.1, which serve to accommodate bolts, so that subframe 1 can be mounted on a vehicle body by means of screw connections. The cast nodes 9, 10 at the front in the direction of travel V also have bush-like connecting elements 9.2, 9.3, 10.2, 10.3 for connecting wheel guide elements (not shown), also called chassis arms or transverse control arms, and also brackets 9.8, 10.8 for connecting an engine or other drive unit.

The cast nodes 9, 10, 11, 12 are cast from aluminium, magnesium or an alloy based on aluminium and/or magnesium. Furthermore, in the embodiment shown in FIG. 1, at least the longitudinal members 3, 4 are manufactured as extruded beams in the form of extruded profiles made of aluminium, magnesium or an alloy based on aluminium and/or magnesium. Preferably also the cross members 6, 7 are manufactured as extruded profiles from a corresponding light metal or light metal alloy.

Both the front cast nodes 9, 10 and the rear cast nodes 11, 12 have arm-shaped beam connecting elements 9.4, 10.4, 11.4, 12.4, onto which the extruded beams, in this embodiment the longitudinal members 3, 4, are placed so that the respective end of the longitudinal members 3, 4 overlaps the associated beam connecting element 9.4, 10.4, 11.4, 12.4. The beam connecting elements 9.4, 10.4, 11.4, 12.4 are designed as pipe sockets. For permanent fixing of the longitudinal members 3, 4 to the assigned cast nodes 9, 10, 11, 12, the respective longitudinal member 3, 4 is welded to the beam connecting element 9.4, 10.4, 11.4, 12.4 of the respective cast node 9, 10, 11, 12 by a weld seam in the form of a lap seam 14.

The cast node 9, 10, 11, 12 has a shoulder on the beam connecting element 9.4, 10.4, 11.4, 12.4 which defines a shoulder end face 16. The end face of the extruded longitudinal member 3, 4 is positioned on the beam connecting element 9.4, 10.4, 11.4, 12.4 in such a way that the shoulder end face 16 on the one hand and the longitudinal member 3, 4 and/or the weld seam (lap seam) 14 at the end face of the longitudinal member 3, 4 on the other hand define a groove-shaped or trench-shaped recess 17, the width or average width W of which is at least 2.5 times, preferably at least 3.5 times, particularly preferably at least 4 times the wall thickness to of the extruded beam. The average width or width W can also be described as the axial offset of the end face of the longitudinal member 3, 4 relative to the shoulder end face 16 of the beam connecting element 9.4, 10.4, 11.4, 12.4. The longitudinal member 3, 4 overlaps the beam connecting element 9.4, 10.4, 11.4, 12.4 with an axial dimension $l_0$ which is smaller than or equal to the width or average width W of the groove-shaped or trench-shaped recess 17.

Figure 2:
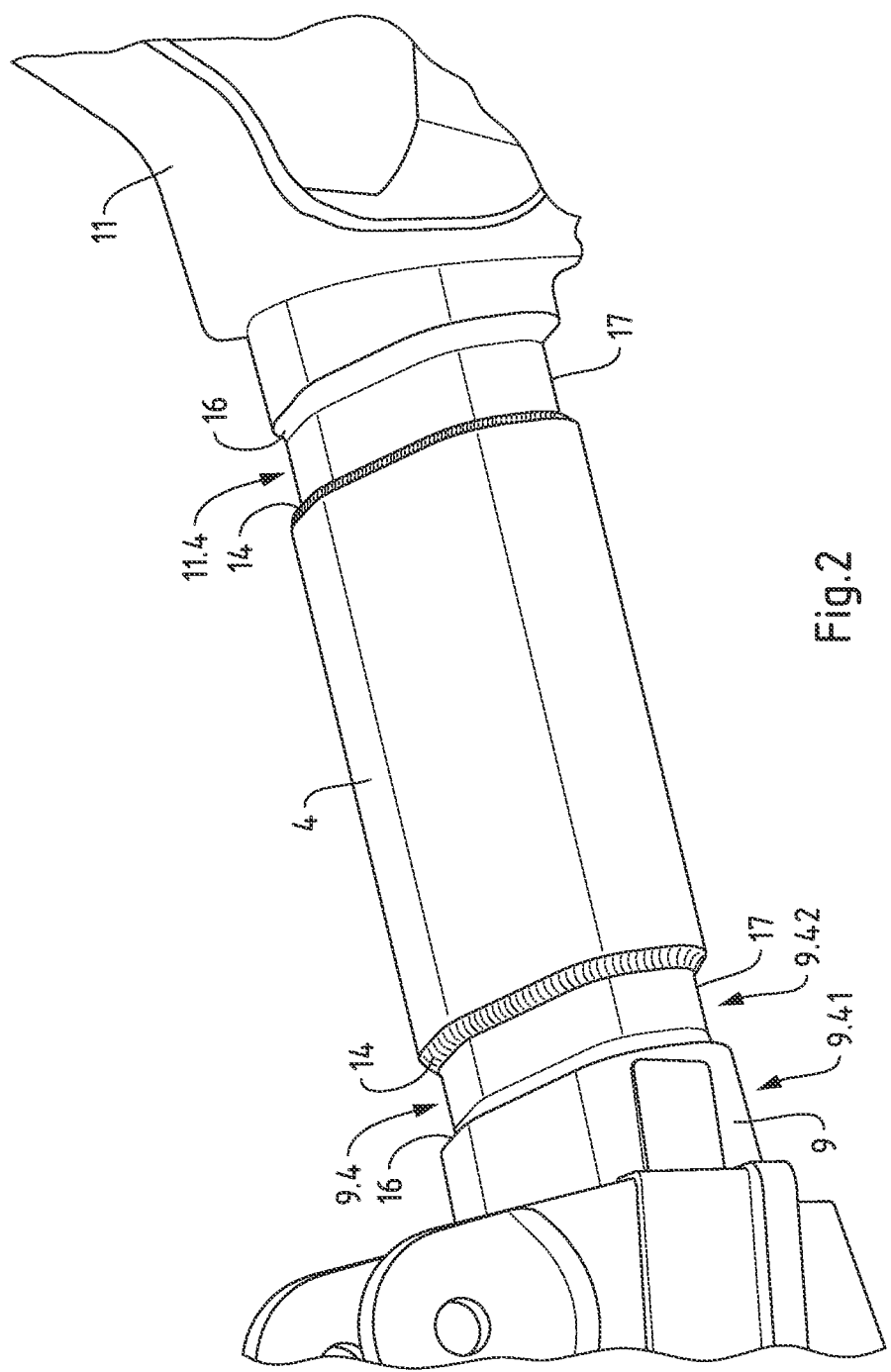
FIG. 2 shows a longitudinal member section of the subframe from FIG. 1 with partly shown cast nodes, in a perspective view.

The longitudinal members 3, 4 and/or the cross members 6, 7 are preferably designed as closed hollow profiles. The longitudinal members 3, 4, for example, have a closed cross-sectional profile, which is composed of substantially straight and curved profile sections (cf. FIGS. 2 and 3). The weld seam 14 in this case is preferably designed as a circumferential lap seam. The section 18, 19 of the beam connecting element 9.4, 10.4, 11.4, 12.4 inserted into the respective end of the longitudinal member 3, 4 has substantially the same cross-sectional profile shape as the longitudinal member 3, 4, however with an outer dimension or outer diameter d1, which is slightly smaller than the inner dimension or outer diameter d3 of the extruded longitudinal member 3, 4. Alternatively, the extruded longitudinal member 3, 4 may also have another closed cross-sectional profile, for example a substantially circular, oval or elliptical hollow profile, or an open cross-sectional profile, for example a U-shaped, V-shaped or C-shaped cross-sectional profile. For example, the front cross member 7 in the direction of travel V is designed as a rectangular hollow profile, while the rear cross member 6 is designed as a substantially oval or polygonal hollow profile, for example.

The front cast nodes 9, 10 and also the rear cast nodes 11, 12 each have several recesses 9.6, 9.7, 10.6, 10.7 and/or chambers 11.6, 11.7, 12.6, 12.7. These give the respective cast node 9, 10, 11, 12 a high rigidity, especially bending rigidity, at a relatively low weight.

The beam connecting elements 9.4 and 11.4 of the cast nodes 9 and 11 each have a wall thickness tc in the area of the groove-shaped or trench-shaped recess 17, which is preferably equal to or thicker than the wall thickness te of the extruded longitudinal member 4. For example, in the area of the groove or trench-shaped recess 17, the beam connecting element 9.4 or 11.4 has a wall thickness tc which is preferably between 1.2 and 3 times, and particularly preferably between 1.5 and 2.5 times the wall thickness te of the extruded beam 4.

The minimum wall thickness tc in the area of the beam connecting element 9.4, for example, is approx. 4.5 mm.

Figure 3:
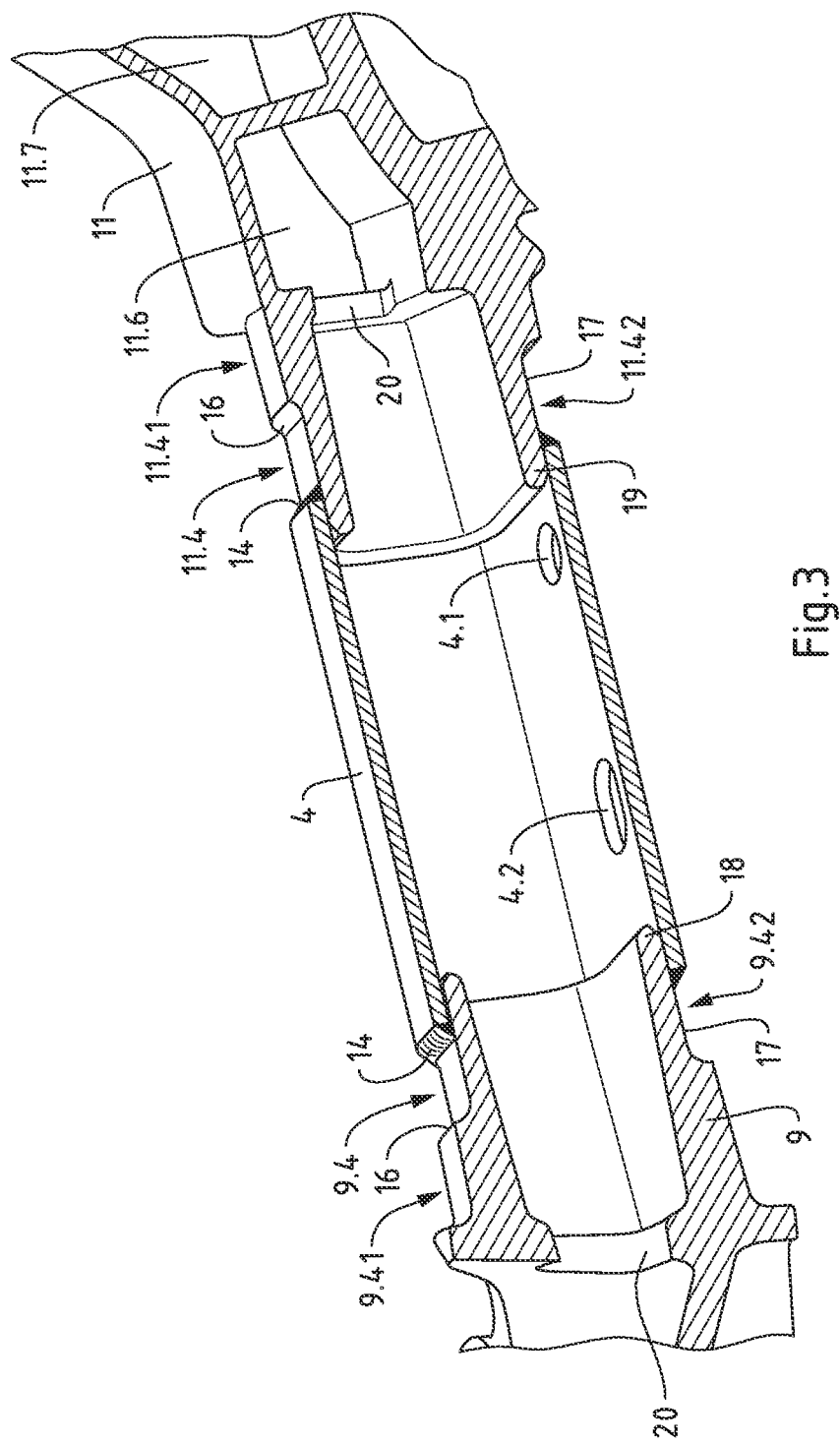
FIG. 3 shows the longitudinal beam section from FIG. 2 with the partly shown cast nodes, in a perspective vertical section view.
Figure 4:
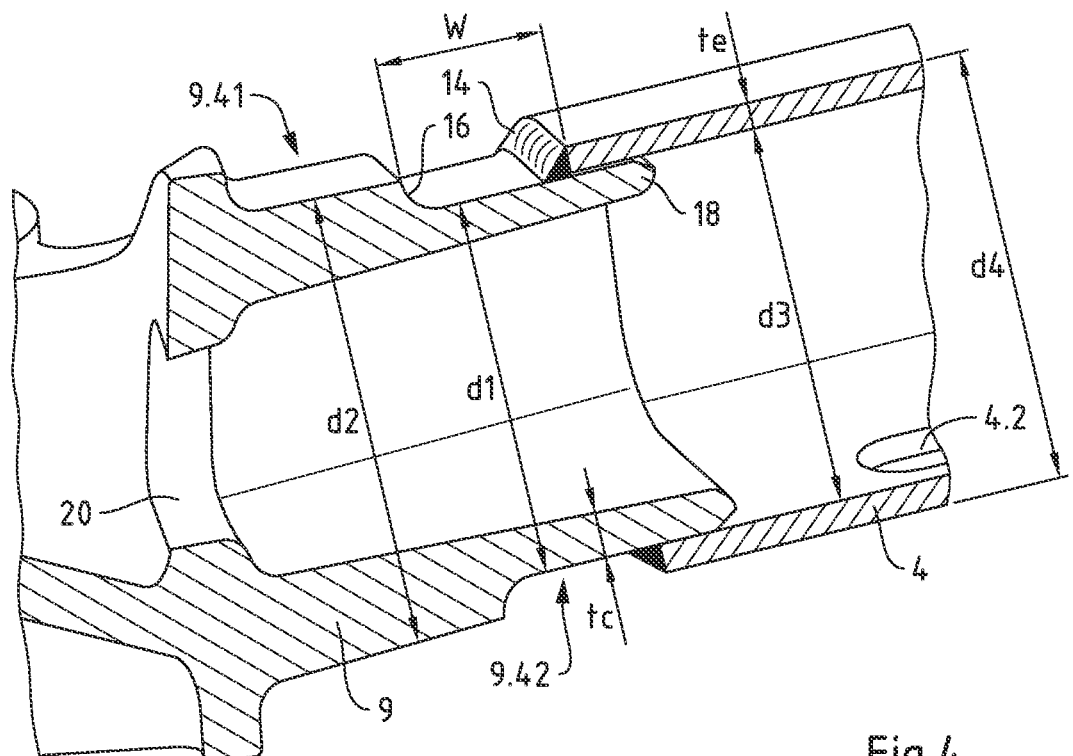
FIG. 4 shows, in comparison to FIG. 3, an enlarged section of one of the cast nodes with a section of the longitudinal member, again in a perspective vertical sectional view.
Figure 5:
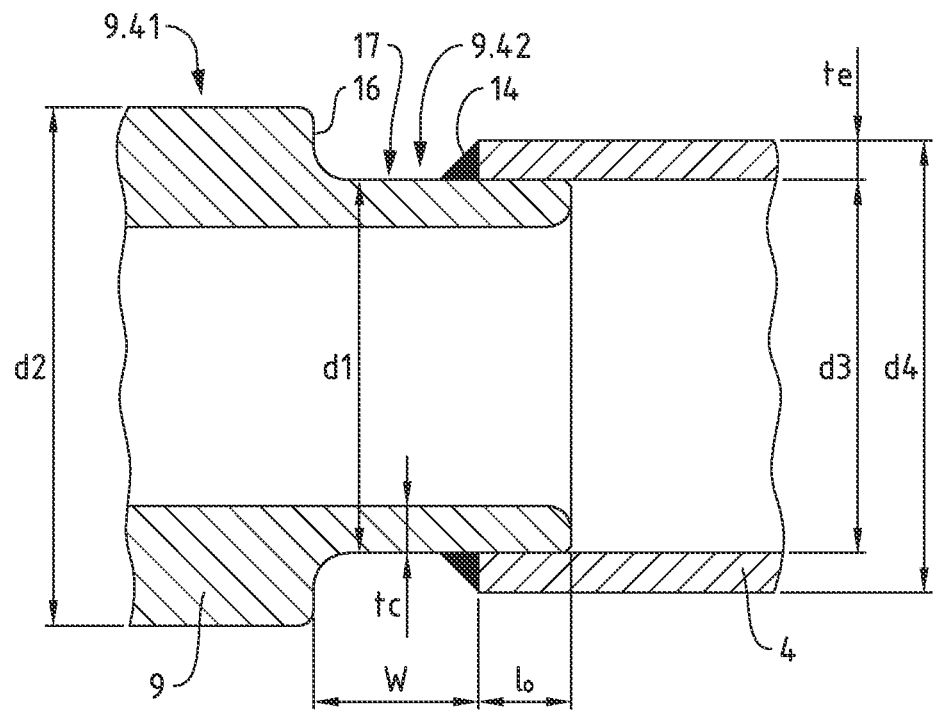
FIG. 5 shows a section of one of the cast nodes with a section of one of the extruded beams, for example longitudinal members, in a schematic vertical sectional view.

In particular FIGS. 3 to 5 show that the respective beam connecting element 9.4, 11.4 has a first substantially axial cast node section 9.41, 11.41 and a second substantially axial cast node section 9.42, 11.42, the second axial cast node section 9.42, 11.42 being welded to the extruded longitudinal member 4 and having a smaller external dimension, for example a smaller external diameter d1, than the first axial cast node section 9.41, 11.41. For example, in this case, the outer dimension or outer diameter d2 of the first axial cast node section 9.41, 11.41 is greater than or equal to the product of the outer dimension or outer diameter d1 of the second axial cast node section 9.42, 11.42 and 1.3 times the wall thickness te of the extruded longitudinal member 4. Preferably, in this case, the outer dimension or outer diameter d2 of the first axial cast node section 9.41, 11.41 is greater than or equal to the outer dimension or outer diameter d4 of the extruded longitudinal member 4 (cf. FIGS. 4 and 5).

The cast node 11 is designed in such a way that the beam connecting element 11.4 has a constriction 20 on the inside at the end of the first axial cast node section 11.41, which end faces away from the longitudinal member 4. The constriction 20 in this case can be designed as an inside bottom bead or as a circumferential constriction (inside rib). The front cast node 9 has a similar constriction 20.

Furthermore it is shown in FIGS. 3 and 4 that the longitudinal member 4 has several through openings 4.1, 4.2 in its profile wall, which are arranged at a distance from the beam connecting element 9.4, 11.4 and open downwards in the intended installation position of the subframe 1.

The execution of the invention is not limited to the embodiments shown in the drawing. Rather, numerous variants are conceivable, which make use of the invention specified in the claims even if the design deviates from the example shown. For example, at least one of the cross members 6, 7 can also be designed as an extruded beam, preferably a hollow profile beam, and connected to the associated cast nodes 9, 10, 11, 12 in such a way that a shoulder is formed on the beam connecting element of the cast node 9, 10, 11, 12 associated with the cross member 6, 7, which shoulder defines a shoulder end face 16, wherein the shoulder end face 16 on the one hand and the extruded cross member 6, 7 and/or the lap seam 14 on the extruded cross member 6, 7 on the other hand define a groove-shaped or trench-shaped recess 17, the width or average width of which is at least 2.5 times, preferably at least 3.5 times, particularly preferably at least 4 times, the wall thickness to of the extruded cross member 6, 7.

The invention claimed is:

1. A subframe for a motor vehicle, comprising
at least three beams, of which, in the assembled state of the subframe, at least two beams extend at a distance from one another, along the longitudinal axis of the motor vehicle and at least one beam extends transversely to the longitudinal axis of the motor vehicle, at least one of the beams being an extruded beam, and
at least one cast node of aluminium, magnesium or an alloy based on aluminium and/or an alloy based on magnesium,
the cast node connecting the extruded beam and at least one of the other beams to another,
wherein the cast node has an arm-shaped beam connecting element,
wherein the extruded beam overlaps the beam connecting element, and
wherein the extruded beam is connected to the beam connecting element by a weld seam,
wherein the cast node has on the beam connecting element a shoulder which defines a shoulder end face, wherein the shoulder end face on the one hand and the extruded support and/or the weld seam on the extruded beam on the other hand define a groove-shaped or trench-shaped recess, whose width or average width (W) is at least 2.5 to 4 times, the wall thickness (te) of the extruded beam, and wherein the weld seam is designed as a lap seam.

2. The subframe according to claim 1, further comprising a fourth beam, of which at least two beams extend at a distance from one another, along the longitudinal axis of the motor vehicle and at least two beams extend at a distance from one another, transversely to the longitudinal axis of the motor vehicle, the two beams extending along the longitudinal axis of the motor vehicle and/or the two beams extending transversely to the longitudinal axis of the motor vehicle, wherein at least four cast nodes corresponding to said cast node are present which, together with the beams, define a closed frame structure, and wherein the extruded beams are connected to the cast nodes in such a way that at least one recess corresponding to said groove-shaped or trench-shaped recess is formed at each of the at least four cast nodes.

3. The subframe according to claim 1, wherein the respective extruded beam is designed as a closed hollow profile.

4. The subframe according to claim 1, wherein the weld seam is designed as a circumferential lap seam.

5. The subframe according to claim 1, wherein the respective extruded beam is made of aluminium, magnesium or an alloy based on aluminium and/or an alloy based on magnesium.

6. The subframe according to claim 1, wherein the respective beam connecting elements designed in the form of a pipe socket.

7. The subframe according to claim 1, wherein the beam connecting element has a wall thickness (tc) in the region of the groove-shaped or trench-shaped recess which is equal to the wall thickness (te) or greater than the wall thickness (te) of the extruded beam.

8. The subframe according to claim 1, wherein the beam connecting element has a wall thickness (tc) in the region of the groove-shaped or trench-shaped recess which is between 1.2 times and 3 times the wall thickness (te) of the extruded beam.

9. The subframe according to claim 1, wherein the respective beam connecting element comprises a first substantially axial cast node portion and a second axial cast node portion, said second axial cast node portion is welded to the extruded beam and has a smaller outer dimension, a smaller outer diameter (d1) than the first axial cast node portion, and wherein the outer dimension or outer diameter (d2) of the first axial cast node portion is greater than or equal to the product of the outer dimension or outer diameter (d1) of the second axial cast node portion and 1.3 times the wall thickness (te) of the extruded beam.

10. The subframe according to claim 9, wherein the outer dimension or outer diameter (d2) of the first axial cast node section is greater than or equal to the outer dimension or outer diameter (d4) of the extruded beam.

11. The subframe according to claim 9, wherein the respective beam connecting element has a constriction on the inside at the end of the first axial cast node section facing away from the extruded beam.

12. The subframe according to claim 1, wherein the extruded beam overlaps the beam connecting element with an axial dimension ($l_0$) which is smaller than or equal to the width or average width (W) of the groove-shaped or trench-shaped recess.

13. The subframe according to claim 1, characterised in that the respective extruded beam has one or more through openings in its profile wall, which are arranged at a distance from the beam connecting element and open downwards in the intended installation position of the subframe.

* * * * *